(12) United States Patent
Kim (10) Patent No.: US 7,525,624 B2
(45) Date of Patent: Apr. 28, 2009

(54) LIQUID CRYSTAL DISPLAY DEVICE AND FABRICATING METHOD THEREOF

(75) Inventor: Se-June Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 561 days.

(21) Appl. No.: 11/137,433

(22) Filed: May 26, 2005

(65) Prior Publication Data

US 2005/0264741 A1    Dec. 1, 2005

(30) Foreign Application Priority Data

May 31, 2004    (KR) .................... 10-2004-0038974

(51) Int. Cl.
*G02F 1/1335*    (2006.01)
*G02F 1/1333*    (2006.01)
*G02F 1/1343*    (2006.01)

(52) U.S. Cl. .................... 349/139; 349/106; 349/110

(58) Field of Classification Search ................ 349/106, 349/110, 141, 44, 139
See application file for complete search history.

(56) References Cited

U.S. PATENT DOCUMENTS

| | | | |
|---|---|---|---|
| 6,038,006 A * | 3/2000 | Sasaki et al. ................ | 349/106 |
| 6,987,548 B2 * | 1/2006 | Lim et al. ................... | 349/106 |
| 7,098,970 B2 * | 8/2006 | Hidehira et al. ............... | 349/44 |
| 7,180,559 B2 * | 2/2007 | Chang et al. ................. | 349/106 |
| 7,227,607 B2 * | 6/2007 | Lee ............................. | 349/141 |
| 2001/0048490 A1 | 12/2001 | Lim et al. | |
| 2002/0118318 A1 | 8/2002 | Hidehira et al. | |
| 2004/0001170 A1 | 1/2004 | Chang et al. | |

FOREIGN PATENT DOCUMENTS

| | | |
|---|---|---|
| KR | 10-2001-0085344 | 9/2001 |
| KR | 10-2002-0045256 | 6/2002 |
| KR | 10-2003-0024367 | 3/2003 |
| KR | 10-0382807 | 4/2003 |
| WO | WO 2004/011999 | 2/2004 |

OTHER PUBLICATIONS

Search Report from French Patent Office.

* cited by examiner

*Primary Examiner*—Julie Ngo
(74) *Attorney, Agent, or Firm*—McKenna Long & Aldridge LLP (57) ABSTRACT

A liquid crystal display device includes first and second substrates facing each other; a liquid crystal material between the first and second substrates; gate and data lines crossing each other on the first substrate to define a pixel region; a thin film transistor adjacent to the crossing of the gate and data lines; a color filter pattern in the pixel region; a first passivation layer on the color filter pattern, the first passivation layer made of an inorganic insulating material; and a pixel electrode on the first passivation layer and electrically connected to the thin film transistor.

22 Claims, 15 Drawing Sheets

LIQUID CRYSTAL DISPLAY DEVICE AND FABRICATING METHOD THEREOF

The present invention claims the benefit of Korean Patent Application No. 2004-0038974, filed in Korea on May 31, 2004, which is hereby incorporated by reference.

BACKGROUND OF THE INVENTION

1. Field of the Invention

The present invention relates to a liquid crystal display device, and more particularly, to a liquid crystal display (LCD) device and a fabricating method thereof.

2. Discussion of the Related Art

Until recently, display devices have typically used cathode-ray tubes (CRTs). Presently, many efforts are being made to study and develop various types of flat panel displays, such as liquid crystal display (LCD) devices, plasma display panels (PDPs), field emission displays (FED), and electro-luminescence displays (ELDs), as a substitute for CRTs. Of these types of flat panel displays, the LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

Figure 1:
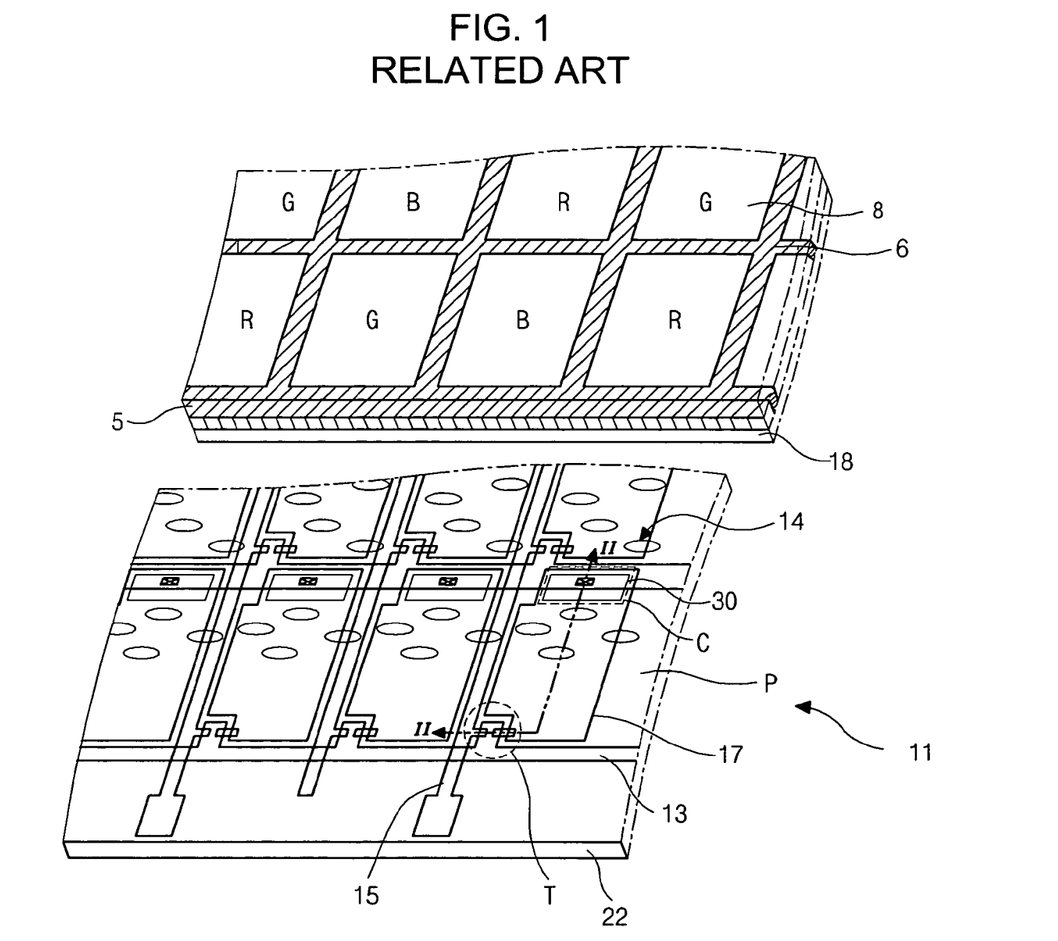
FIG. 1 is an expanded perspective view of an LCD device according to the related art.

FIG. 1 is a perspective view of an LCD device according to the related art. As shown in FIG. 1, the LCD device 11 includes a first substrate 22, a second substrate 5 and a liquid crystal material 14. The second substrate 5 is referred to as a color filter substrate that includes a color filter pattern 8, a black matrix 6 between the color filter patterns 8, and a common electrode 18 on both the color filter pattern 8 and the black matrix 6. The first substrate 22 is referred to as an array substrate that includes a data line 15 and a gate line 13 that cross each other to define a pixel region P. A pixel electrode 17 and a thin film transistor T, as a switching element, are positioned in each pixel region P. Thin film transistors T, which are disposed adjacent to where the data lines 15 and the gate lines 13 cross, are disposed in a matrix form on the first substrate 22. The gate line 13 and a storage electrode 30 overlap the gate line 13 to define a storage capacitor C.

The first and second substrates 22 and 5 have patterns that block light. The first and second substrates 22 are aligned to each other and then attached. There is a possibility of light leakage in the LCD device due to a misalignment between the first and second substrates 22 and 5.

Figure 2:
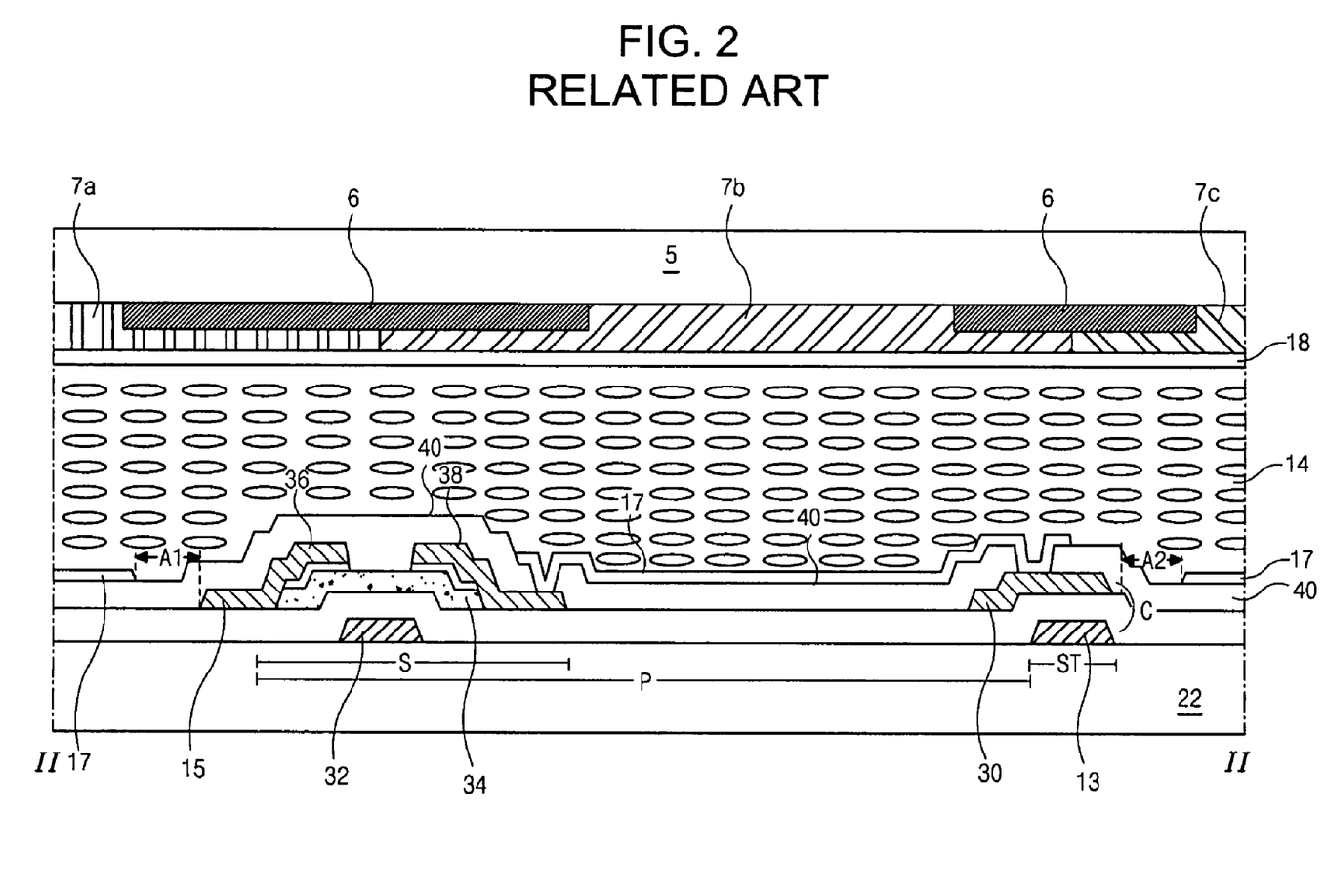
FIG. 2 is a cross-sectional view taken along line II-II of FIG. 1.

FIG. 2 is a cross-sectional view taken along line II-II of FIG. 1. As shown in FIG. 2, a thin film transistor T in a switching region S includes a gate electrode 32, a semiconductor pattern 34, a source electrode 36 and a drain electrode 38 disposed on the first substrate 22. A passivation layer 40 is disposed on the thin film transistor T. A pixel electrode 17 is disposed on the passivation layer 40 in each pixel region P. A storage capacitor C includes a gate line 13 and a storage electrode 30 overlapping the gate line 13. A black matrix 6 corresponding to a gate line 13, a data line 15 and a thin film transistor T is disposed on the second substrate 5. Red, green and blue color filter patterns 7a, 7b and 7c corresponding to respective pixel regions P are also disposed on the second substrate 5. A liquid crystal material 14 is interposed between the first and second substrates 22 and 5.

To prevent cross-talk, the data line 15 and the gate line 13 are spaced apart from the pixel electrode 17 by a first distance A1 and a second distance A2, respectively. Since light leakage can occur through the areas defined by the first and second distances A1 and A2, the black matrix 6 covers the areas defined by first and second distances A and B. Further, the black matrix 6 blocks incident light from affecting the semiconductor pattern 34. Due to the possibility of misalignment during attachment of the first and second substrates 22 and 5, the black matrix 6 has a margin of error to compensate for misalignment. Thus, an aperture ratio of the LCD is reduced by margin of error for the black matrix 6. When misalignment during attachment of the first and second substrates 22 and 5 is greater than the margin of error, some of the areas defined by the first and second distances A1 and A2 are not covered by the black matrix 6 so that light leakage occurs.

SUMMARY OF THE INVENTION

Accordingly, the present invention is directed to a liquid crystal display device and a method of fabricating a liquid crystal display device that substantially obviates one or more of problems due to limitations and disadvantages of the related art.

An object of the present invention is to provide a liquid crystal display device that can improve an aperture ratio and reduce light leakage.

Another object of the present invention is to provide a method of fabricating a liquid crystal display device that can improve an aperture ratio and reduce light leakage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing each other; a liquid crystal material between the first and second substrates; gate and data lines crossing each other on the first substrate to define a pixel region; a thin film transistor adjacent to the crossing of the gate and data lines; a color filter pattern in the pixel region; a first passivation layer on the color filter pattern, the first passivation layer made of an inorganic insulating material; and a pixel electrode on the first passivation layer and connected to the thin film transistor.

In another aspect, a method of fabricating a liquid crystal display device includes forming gate and data lines crossing each other on a first substrate to define a pixel region; forming a thin film transistor adjacent to the crossing of the gate and data lines; forming a color filter pattern in the pixel region; forming a first passivation layer on the color filter pattern, the first passivation layer made of an inorganic insulating material; forming a pixel electrode on the first passivation layer and connected to the thin film transistor; attaching the first substrate and a second substrates; and injecting a liquid crystal material between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the illustrated embodiments of the present invention, which are illustrated in the accompanying drawings.

Figure 3:
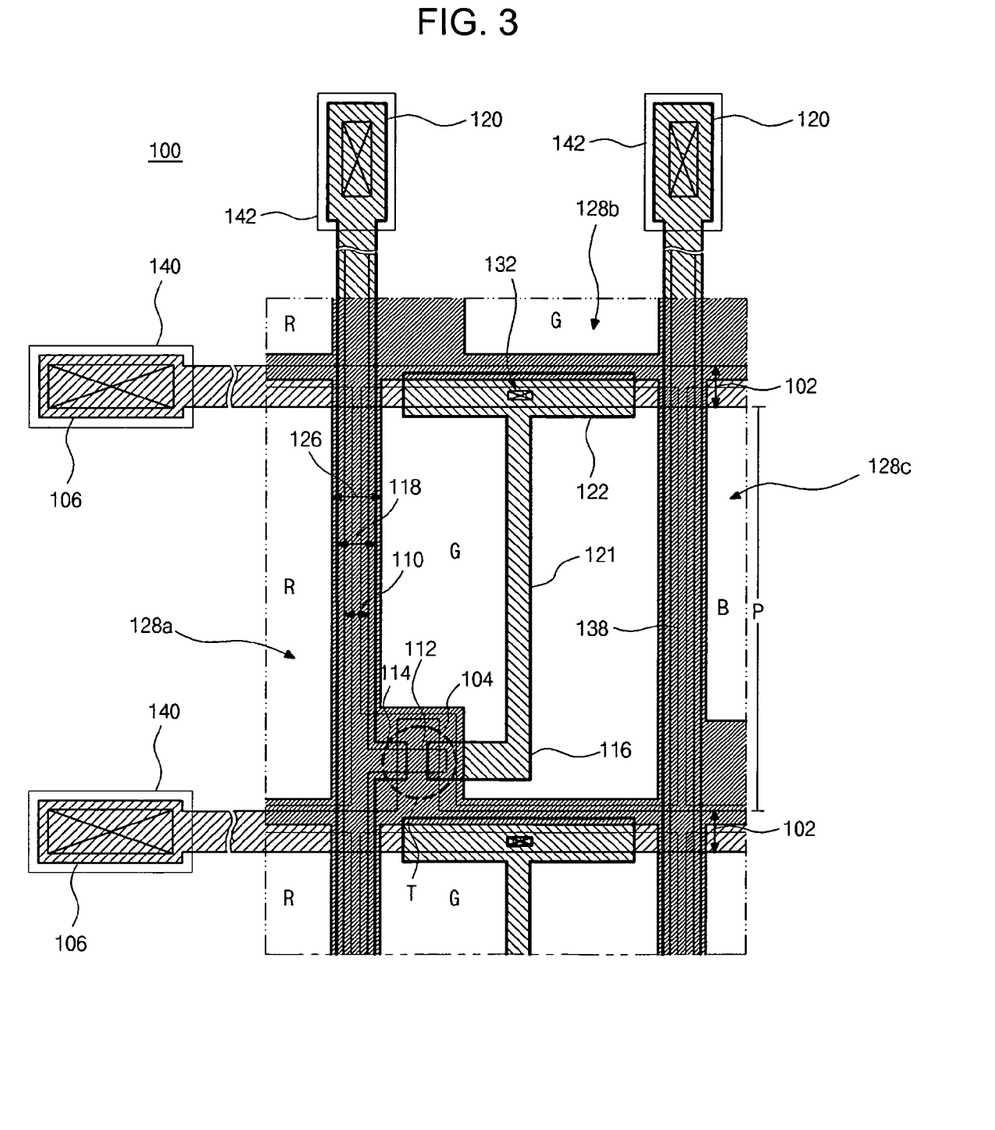
FIG. 3 is a plan view of a substrate for an LCD device according to an exemplary embodiment of the present invention.

FIG. 3 is a plan view of a substrate for an LCD device according to an exemplary embodiment of the present invention. As shown in FIG. 3, a gate line 102 and a data line 118 are disposed on a substrate 100 and cross each other to define a pixel region P. A gate pad electrode 106 is disposed on one end of the gate line 102, and a data pad electrode 120 is disposed on one end of the data line 118. A gate pad electrode terminal 140 and a data pad electrode terminal 142 are disposed on the gate and data pad electrodes 106 and 120.

A thin film transistor T is disposed adjacent to the crossing of the gate and data lines 102 and 118. The thin film transistor T includes a gate electrode 104, a first semiconductor pattern 112, and source and drain electrodes 114 and 116. A second semiconductor pattern 110 is disposed below the data line 118 and extends along the data line 102.

Red (R), green (G) and blue (B) color filter patterns 128a, 128b and 128c are disposed in respective pixel regions P. A black matrix 126 covers the thin film transistor T and the data line 118, and overlaps the gate line 102. In the alternative, the black matrix 126 may cover the gate line 102.

A storage electrode 122 is disposed over the gate line 102 to define a storage capacitor C. The storage electrode 122 is connected to the drain electrode 116 through a connection line 121 in the pixel region P. A pixel electrode 138 is disposed in each pixel region P. The pixel electrode 138 is connected to the drain electrode 116 through the connection line 121 and the storage electrode 122. The pixel electrode 138 contacts the storage electrode 122 through a first contact hole 132.

As explained above, the color filter patterns are formed on the substrate where the thin film transistor, the gate and data lines and other layers are also formed. Accordingly, misalignment in attaching the two substrates for the LCD is no longer a concern. Thus, the aperture ratio of the LCD can increase and light leakage can be reduced in exemplary embodiments of the present invention.

Figure 4:
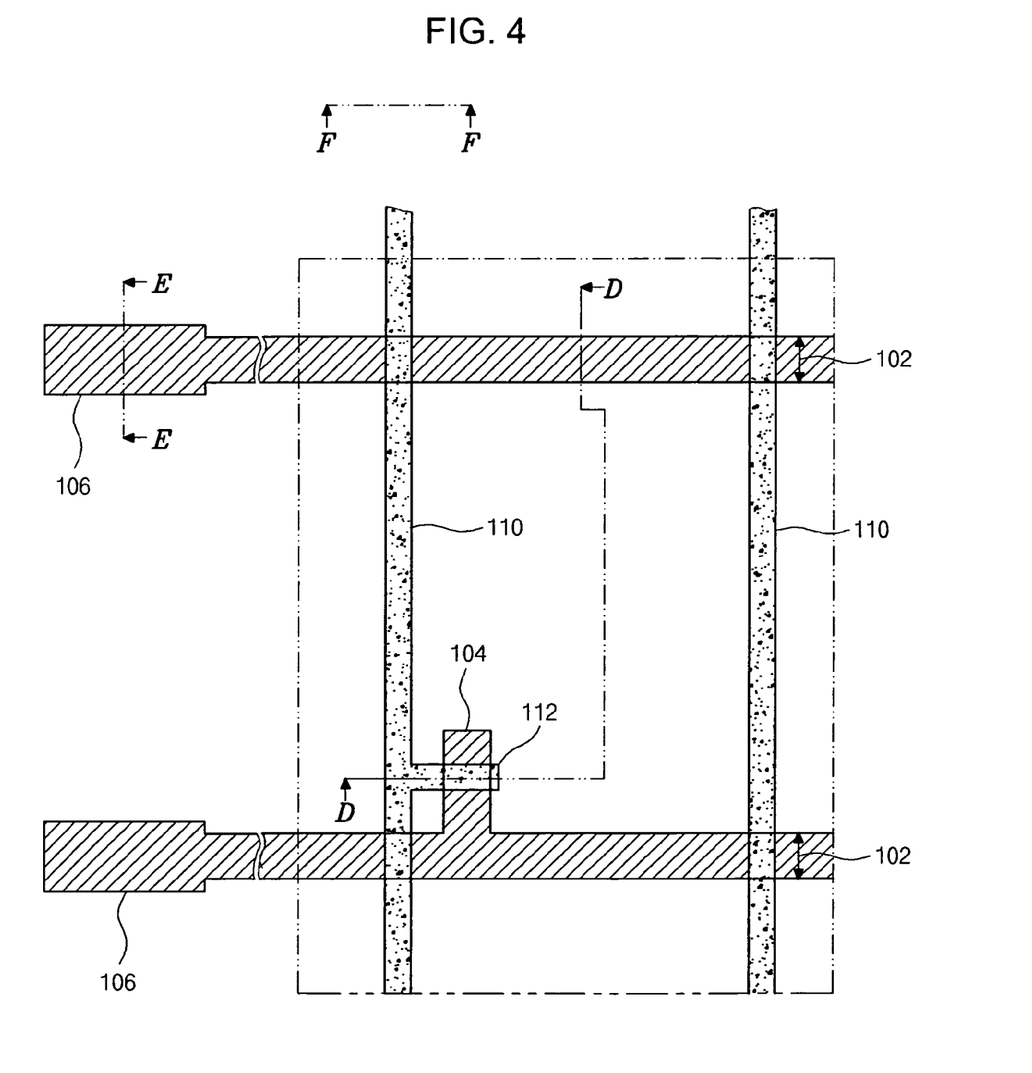
FIG. 4 is a plan view of first and second mask processes for forming a substrate for an LCD device according to an exemplary embodiment of the present invention.
Figure 5A:
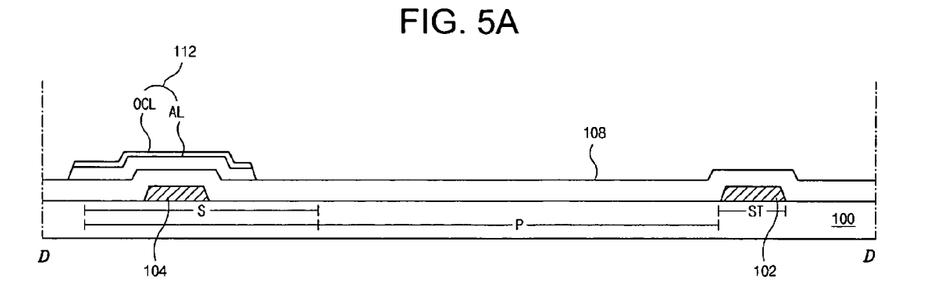
FIGS. 5A to 5C are cross-sectional views taken along lines D-D, E-E and F-F of FIG. 4, respectively.
Figure 5B:
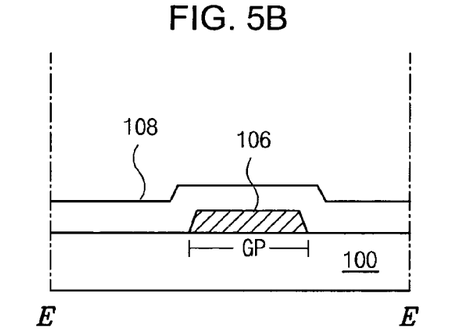
Figure 5C:
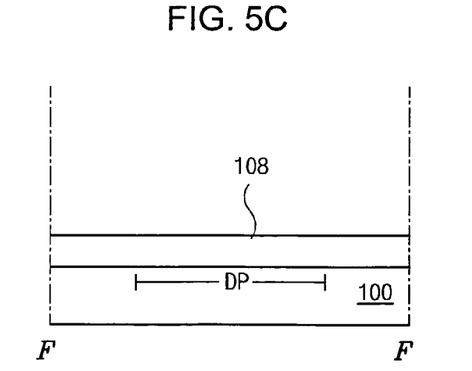

FIG. 4 is a plan view of first and second mask processes for forming a substrate for an LCD device according to an exemplary embodiment of the present invention, and FIGS. 5A to 5C are cross-sectional views taken along lines D-D, E-E and F-F of FIG. 4, respectively. As shown in FIGS. 4 and 5A to 5C, a first metal is deposited on a substrate 100 having a pixel region P, a switching region S, a storage region ST, a gate pad region GP and a data pad region DP. The first metal is patterned with a first mask process to form a gate line 102, a gate electrode 104 and a gate pad electrode 106. The gate pad electrode 106 is formed in the gate pad region GP. The first metal may be at least one of aluminum (Al), aluminum alloy (AlNd), copper (Cu), tungsten (W), chromium (Cr) and molybdenum (Mo).

A gate insulator 108 is formed on the entire surface of the substrate 100 having the gate line 102, as shown in FIG. 5A. The gate insulator 108 can have a step profile over the gate pad electrode 106, as shown in FIG. 5B. The gate insulator 108 can be made of an inorganic insulating material, such as silicon nitride (SiNx) or silicon oxide ($SiO_2$).

An intrinsic amorphous silicon (a-Si:H) and an impurity-doped amorphous silicon (n+a-Si:H) are sequentially deposited on the gate insulator 108, and are patterned with a second mask process to form first and second semiconductor patterns 112 and 110. The first semiconductor pattern 112 is formed in a first direction within the switching region S, and the second semiconductor pattern 110 extends along a second direction perpendicular to the second direction. Each of the first and second semiconductor patterns 112 and 110 includes a lower layer of the intrinsic amorphous silicon and an upper layer of the impurity-doped amorphous silicon OCL. In particular, the lower and upper layers of the first semiconductor pattern 112 are referred to as an active layer AL and the ohmic contact layer OCL, respectively.

Figure 6:
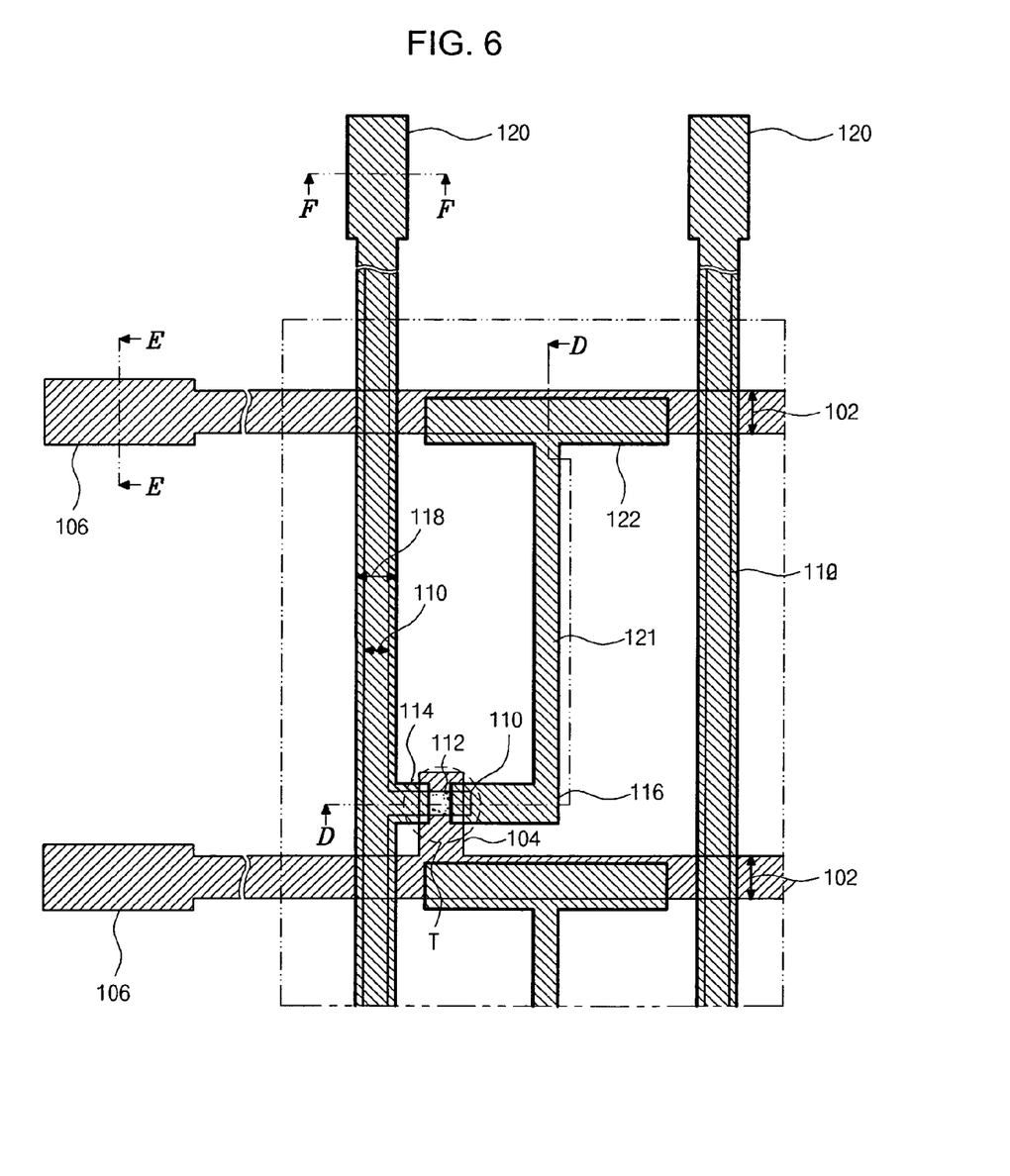
FIG. 6 is a plan view of a third mask process for forming a substrate for an LCD device according to an exemplary embodiment of the present invention.
Figure 7A:
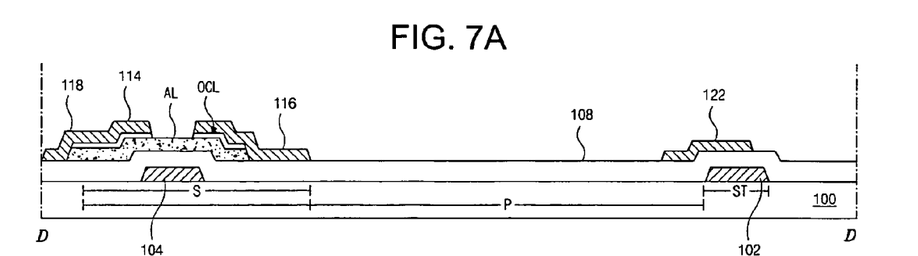
FIGS. 7A to 7C are cross-sectional views taken along lines D-D, E-E and F-F of FIG. 6, respectively.
Figure 7B:
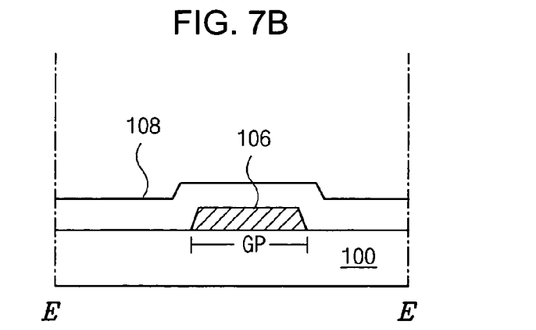
Figure 7C:
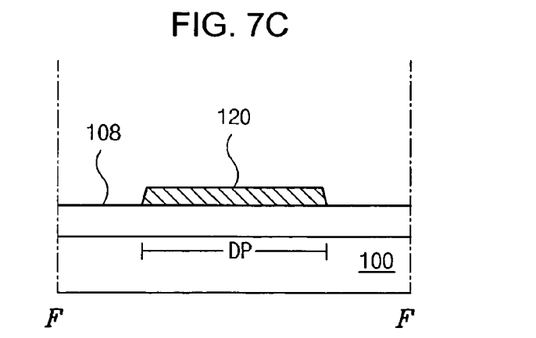

FIG. 6 is a plan view of a third mask process for forming a substrate for an LCD device according to an exemplary embodiment of the present invention, and FIGS. 7A to 7C are cross-sectional views taken along lines D-D, E-E and F-F of FIG. 6, respectively. As shown in FIGS. 6 and 7A to 7C, a second metal is deposited on the substrate 100 having the semiconductor patterns 110 and 112. The second metal is patterned with a third mask process to form a data line 118, source and drain electrodes 114 and 116, a data pad electrode 120, a connection line 121 and a storage electrode 122. The data line 118 is extended along an extension direction of the second semiconductor pattern 110 and covers the second semiconductor pattern 110. The data pad electrode 120 is formed in the data pad region GP. The second metal may be at least one of aluminum (Al), aluminum alloy (AlNd), copper (Cu), tungsten (W), titanium (Ti), chromium (Cr) and molybdenum (Mo).

The ohmic contact layer OCL of the first semiconductor pattern 112 is etched with the source and drain electrodes 114 and 116 apart from each other as an etching mask, and thus the active layer AL of the first semiconductor pattern 112 is exposed through the source and drain electrodes 114 and 116.

Figure 8:
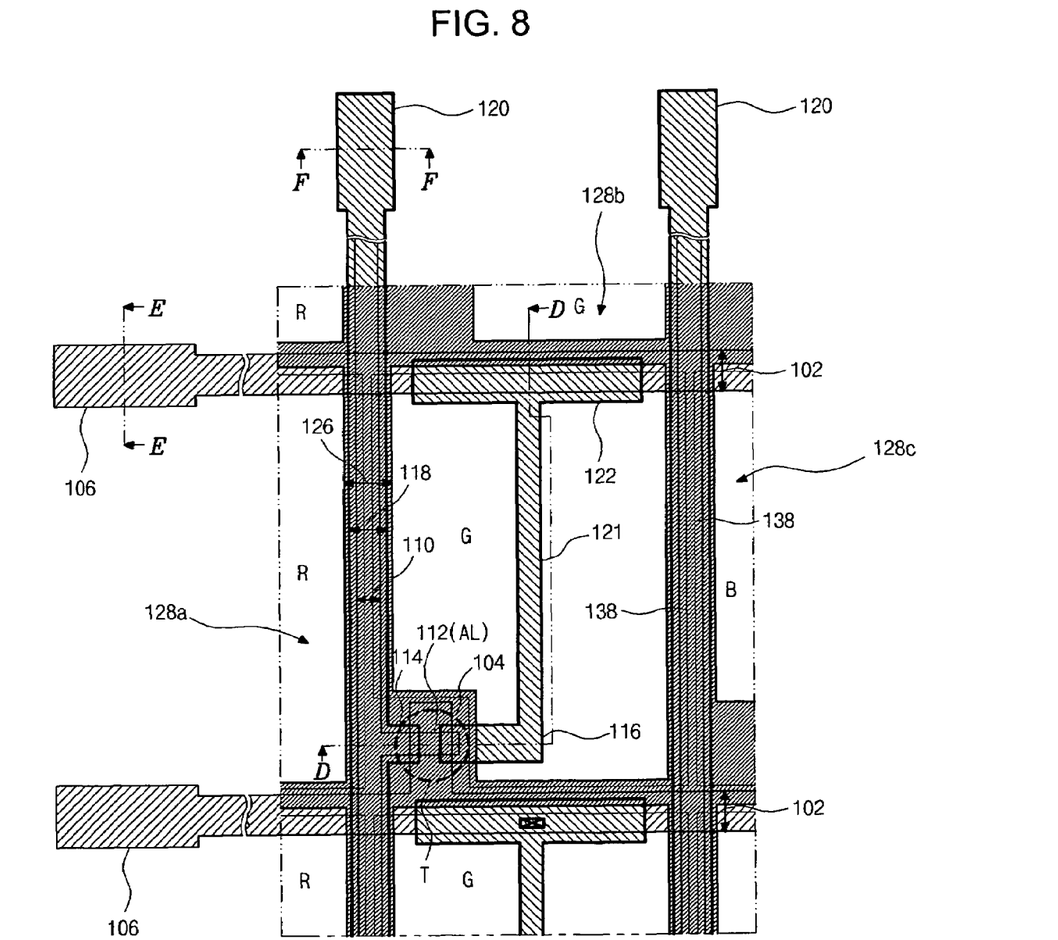
FIG. 8 is a plan view of fourth and fifth mask processes for forming a substrate for an LCD device according to an exemplary embodiment of the present invention.
Figure 9A:
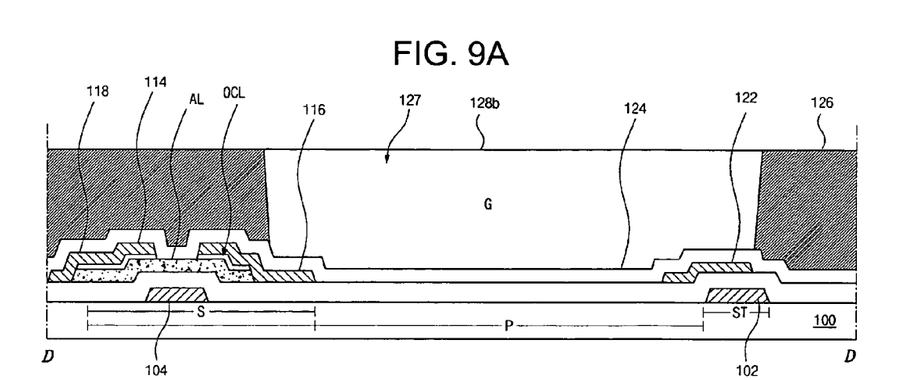
FIGS. 9A to 9C are cross-sectional views taken along lines D-D, E-E and F-F of FIG. 8, respectively.
Figure 9B:
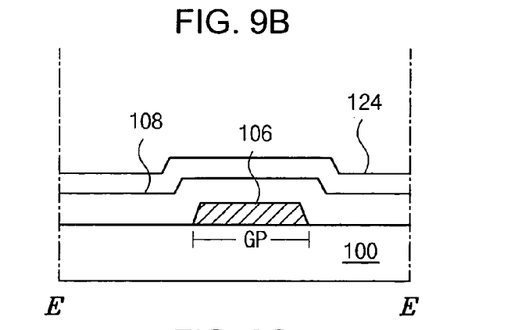
Figure 9C:
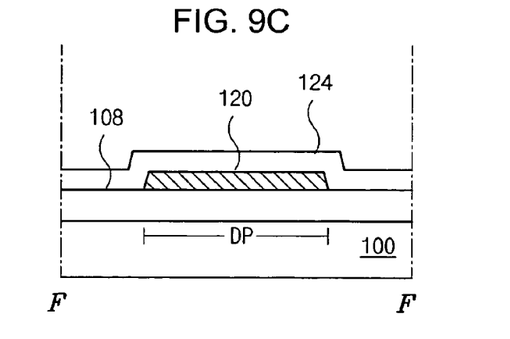

FIG. 8 is a plan view of fourth and fifth mask processes for forming a substrate for an LCD device according to an exemplary embodiment of the present invention, and FIGS. 9A to 9C are cross-sectional views taken along lines D-D, E-E and F-F of FIG. 8, respectively. As shown in FIGS. 8 and 9A to 9C, a first passivation layer 124 is formed on the entire surface of the substrate 100 having the data line 118. The first passivation layer 124 may be made of an inorganic insulating material including silicon nitride (SiNx) and silicon oxide (SiO2).

A photo-sensitive black resin is deposited on the first passivation layer 124, and is patterned with a fourth mask process to form a black matrix 126. The black matrix 126 can cover a thin film transistor T and the data line 118, and can overlap the gate line 102. The black matrix 126 has an opening 127 corresponding to each pixel region P. Red (R), green (G) and blue (B) color resins are sequentially deposited, and are patterned with a fifth mask process to form red (R), green (G) and blue (B) color filter patterns 128a, 128b and 128c are formed in respective openings 127.

Figure 10:
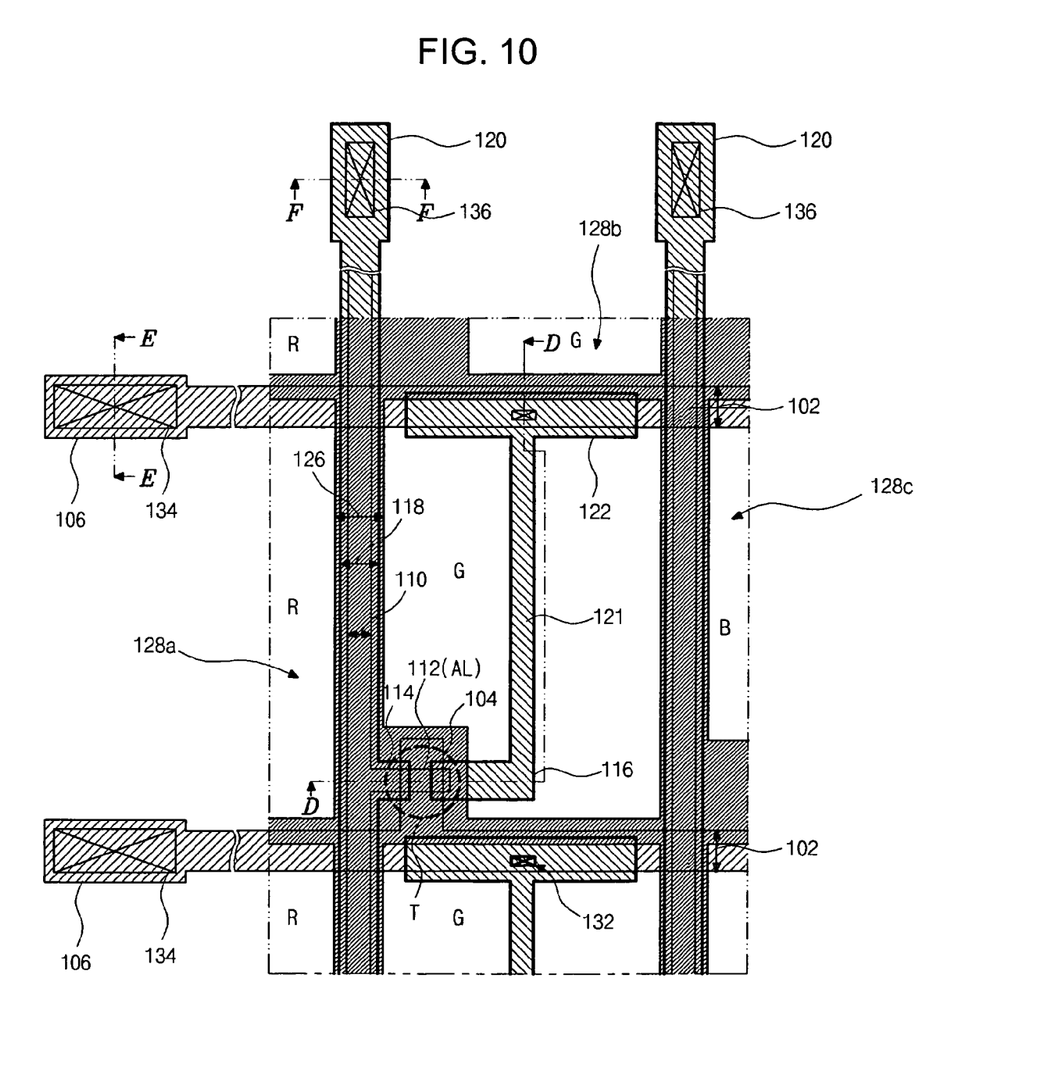
FIG. 10 is a plan view of a sixth mask process for forming a substrate for an LCD device according to an exemplary embodiment of the present invention.
Figure 11A:
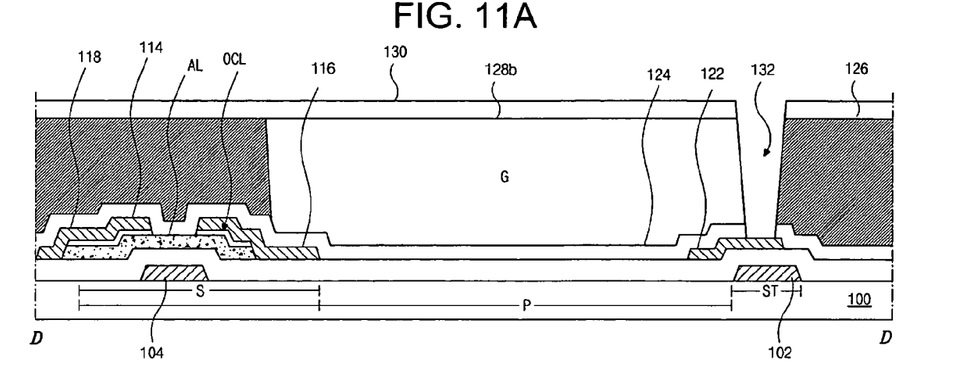
FIGS. 11A to 11C are cross-sectional views taken along lines D-D, E-E and F-F of FIG. 10, respectively.
Figure 11B:
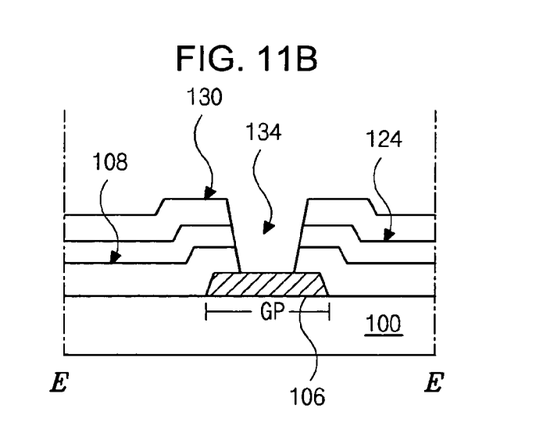
Figure 11C:
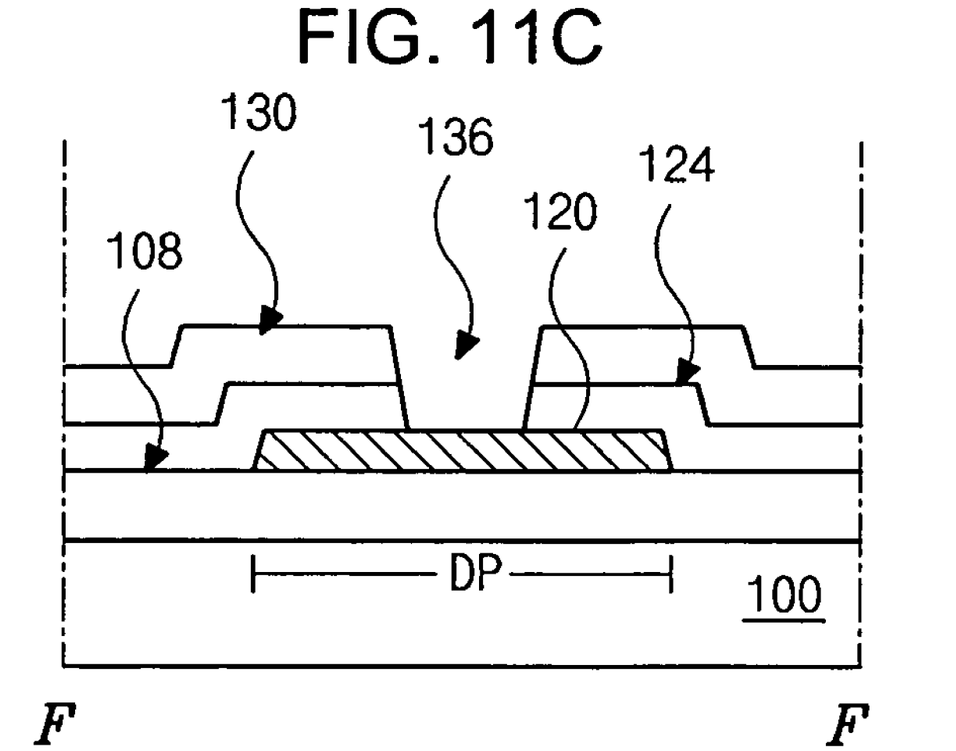

FIG. 10 is a plan view of a sixth mask process for forming a substrate for an LCD device according to an exemplary embodiment of the present invention, and FIGS. 11A to 11C are cross-sectional views taken along lines D-D, E-E and F-F of FIG. 10, respectively. As shown in FIGS. 10 and 11A to 11C, a second passivation layer 130 is formed on the substrate 100 having the color filter patterns 128a, 128b and 128c. The second passivation layer 130 planarizes the substrate 100 having the color filter patterns 128a, 128b and 128c. The second passivation layer 130 may be made of an inorganic insulating material, such as silicon nitride (SiNx) or silicon oxide ($SiO_2$).

With a sixth mask process, first, second and third contact holes 132, 134 and 136 are formed. The first contact hole 132 are formed by etching the second passivation layer 130, each color filter pattern 128a, 128b and 128c, and the first passivation layer 124, and thus the first contact hole 132 exposes the storage electrode 122 in the storage region ST. The second contact hole 134 is formed by etching the second passivation layer 130, the first passivation layer 124 and the gate insulator 108, and thus the second contact hole 134 exposes the gate pad electrode 106 in the gate pad region GP. The third contact hole 136 is formed by etching the second passivation layer 130 and the first passivation layer 124, and thus the third contact hole 136 exposes the data pad electrode 120 in the data pad region DP.

Figure 12:
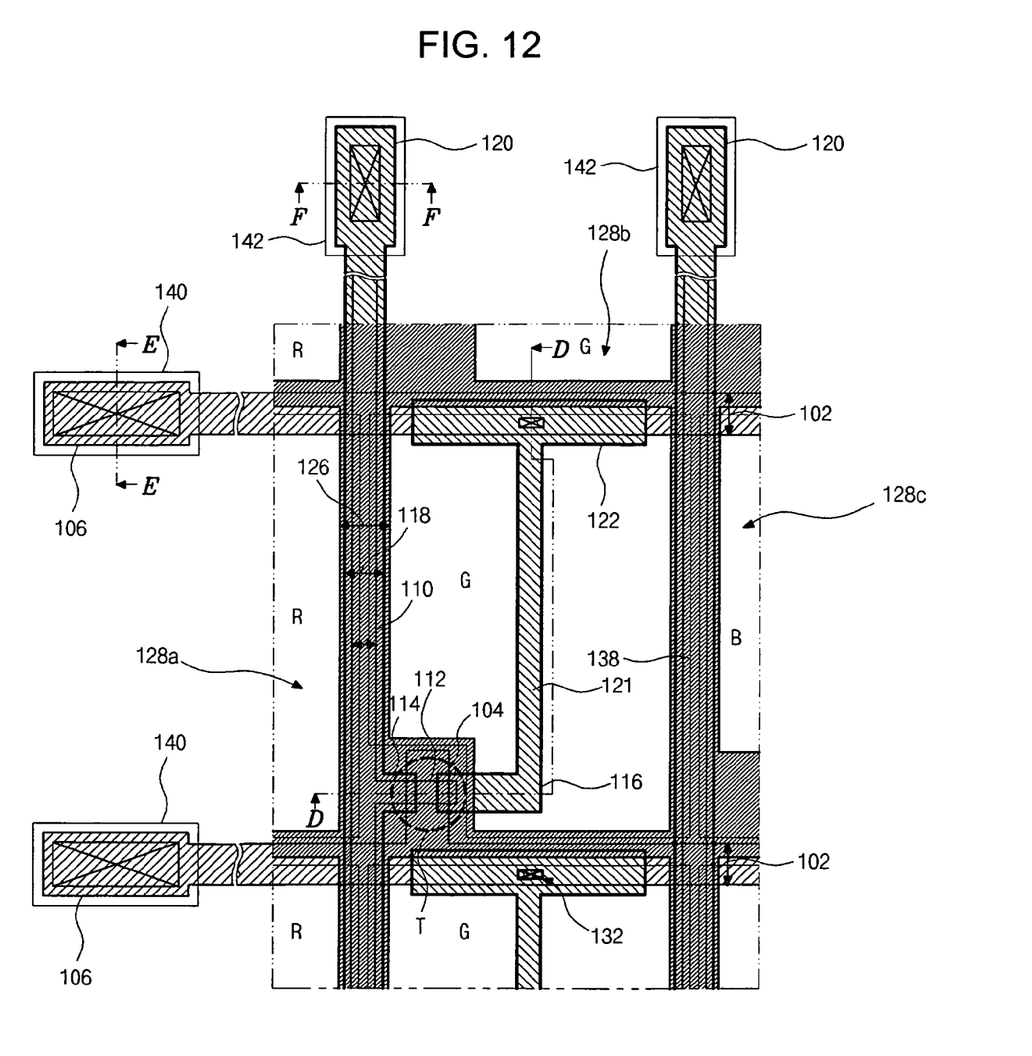
FIG. 12 is a plan view of a seventh mask process for forming a substrate for an LCD device according to an exemplary embodiment of the present invention.
Figure 13A:
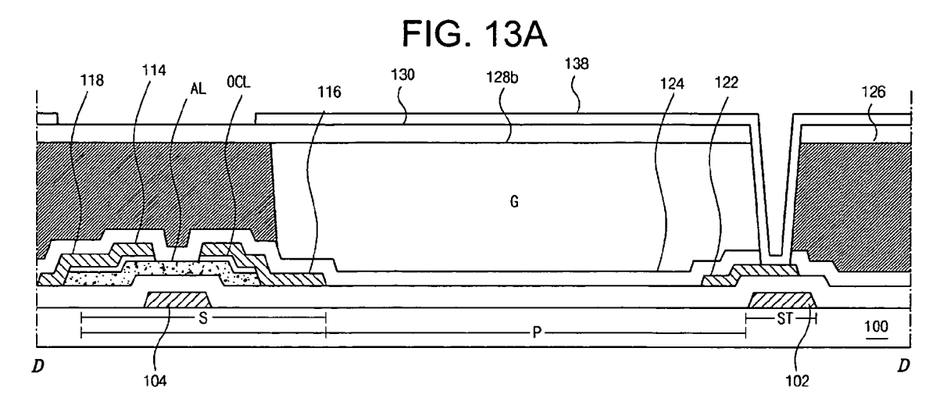
FIGS. 13A to 13C are cross-sectional views taken along lines D-D, E-E and F-F of FIG. 12, respectively.
Figure 13B:
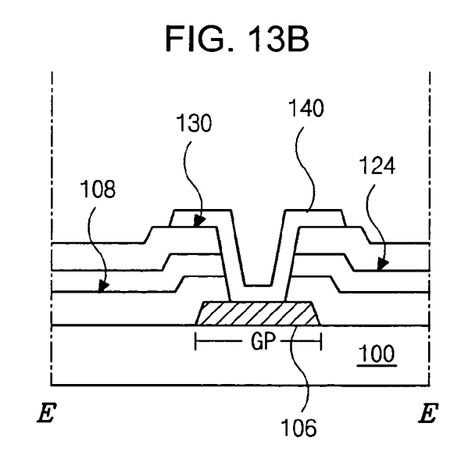
Figure 13C:
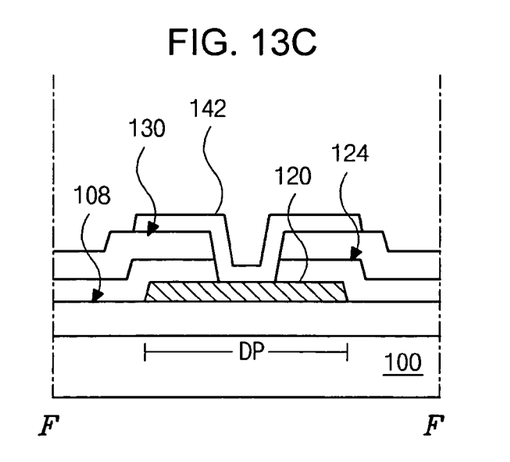

FIG. 12 is a plan view of a seventh mask process for forming a substrate for an LCD device according to an exemplary embodiment of the present invention, and FIGS. 13A to 13C are cross-sectional views taken along lines D-D, E-E and F-F of FIG. 12, respectively. As shown in FIGS. 12 and 13A to 13C, a transparent conductive material is deposited on the second passivation layer 130, and is patterned with a seventh mask process to form a pixel electrode 138, a gate pad electrode terminal 140 and a data pad electrode terminal 142. The pixel electrode 138 contacts the storage electrode 122 through the first contact hole 132, the gate pad electrode terminal 140 contacts the gate pad electrode 106 through the second contact hole 134, and the data pad electrode terminal 142 contacts the data pad electrode 120 through the third contact hole 136. The transparent conductive material may include indium-tin-oxide (ITO) and indium-zinc-oxide (IZO).

Through the above explained processes, the substrate for the LCD device of the present invention is fabricated. In the substrate for the LCD, an inorganic insulating material is used as the second passivation layer on the color filter patterns. If an organic insulating material is used as the second passivation layer, contacting characteristics of the organic insulating material and the color filter pattern is deteriorated, and thus over-etching is generated. Further, if using the organic insulating material, the substrate for the LCD device requires a separate planarization layer to planarize the substrate. Accordingly, to solve these problems, the inorganic insulating material is used as the second passivation layer.

According to the above explained processes, the color filter patterns and the thin film transistor are formed on the same substrate. Such a substrate is attached to the opposite substrate having a common electrode.

Figure 14:
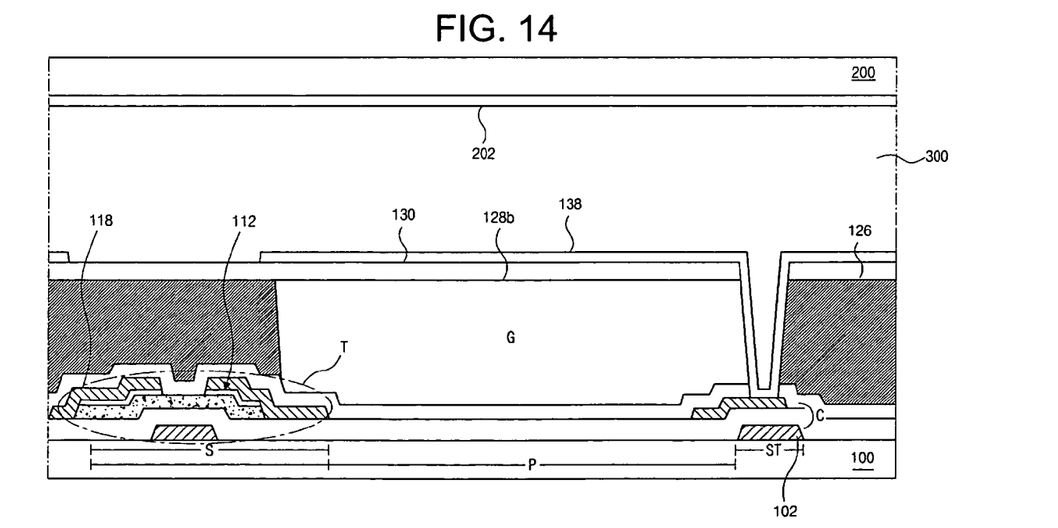
FIG. 14 is a cross-sectional view of an LCD device according to an exemplary embodiment of the present invention.

FIG. 14 is a cross-sectional view of an LCD device according to an exemplary embodiment of the present invention. As shown in FIG. 14, an LCD device includes first and second substrates 100 and 200 facing each other, and a liquid crystal material 300 interposed between the first and second substrate 100 and 200. The first substrate 100 is the same as the substrate 100 as shown in FIG. 3. Accordingly, a thin film transistor T is disposed in the switching region S, and a color filter pattern 128b is disposed in the pixel region P. A black matrix 126 covers a thin film transistor T, and a second planarization layer 130 of an inorganic insulating material is disposed on the color filter pattern 128b and the black matrix 126. A pixel electrode 138 is disposed on the second passivation layer 130. A storage capacitor C is disposed in the storage region ST. A common electrode 202 is disposed on the substrate 200. The common electrode 202 induces an electric field to the liquid crystal material 300 with the pixel electrode 138. The common electrode 202 may be made of a transparent conductive material including indium-tin-oxide (ITO) and indium-zinc-oxide (IZO).

It will be apparent to those skilled in the art that various modifications and variations can be made in the LCD device and the method of fabricating the LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing each other;
   a liquid crystal material between the first and second substrates;
   gate and data lines crossing each other on the first substrate to define a pixel region;
   a thin film transistor adjacent to the crossing of the gate and data lines;
   a color filter pattern in the pixel region;
   a first passivation layer on the color filter pattern, the first passivation layer made of an inorganic insulating material; and
   a pixel electrode on the first passivation layer and electrically connected to the thin film transistor.

2. The device according to claim 1, further comprising a black matrix on the thin film transistor.

3. The device according to claim 2, wherein the black matrix covers the thin film transistor and the data line.

4. The device according to claim 3, wherein the black matrix overlaps the gate line.

5. The device according to claim 1, further comprising a storage electrode overlapping the gate line and contacting the pixel electrode.

6. The device according to claim 5, further comprising a connection line connecting the thin film transistor and the storage electrode.

7. The device according to claim 6, wherein the thin film transistor includes a gate electrode, a first semiconductor pattern, and source and drain electrodes.

8. The device according to claim 7, further comprising a second semiconductor pattern disposed below the data line and extending along the data line.

9. The device according to claim 5, further comprising a second passivation layer between the storage electrode and the color filter pattern.

10. The device according to claim 9, wherein the first passivation layer, the color filter pattern and the second passivation layer have a contact hole.

11. The device according to claim 10, wherein the contact hole exposes at least a portion of the storage electrode.

12. A method of fabricating a liquid crystal display device, comprising:
    forming gate and data lines crossing each other on a first substrate to define a pixel region;
    forming a thin film transistor adjacent to the crossing of the gate and data lines;
    forming a color filter pattern in the pixel region;
    forming a passivation layer on the color filter pattern, the passivation layer be made of an inorganic insulating material;
    forming a pixel electrode on the passivation layer and electrically connected to the thin film transistor;
    attaching the first substrate and a second substrates; and
    injecting a liquid crystal material between the first and second substrates.

13. The method according to claim 12, further comprising forming a black matrix on the thin film transistor.

14. The method according to claim 13, further comprising forming the black matrix covers the thin film transistor and the data line.

15. The method according to claim 14, further comprising forming the black matrix to overlap the gate line.

16. The method according to claim 12, further comprising forming a storage electrode overlapping the gate line and contacting the pixel electrode.

17. The method according to claim 16, further comprising forming a connection line connecting the thin film transistor and the storage electrode.

18. The method according to claim 17, wherein forming the thin film transistor includes forming a gate electrode, a first semiconductor pattern, and source and drain electrodes.

19. The method according to claim 18, further comprising forming a second semiconductor pattern below the data line and extending along the data line.

20. The method according to claim 16, further comprising forming another passivation layer between the storage electrode and the color filter pattern.

21. The method according to claim 20, further comprising a contact hole in the passivation layer and the color filter pattern and the another passivation layer.

22. The method according to claim 21, wherein the, contact hole exposes at least a portion of the storage electrode.

* * * * *